(12) United States Patent
Vergine et al.

(10) Patent No.: US 12,275,054 B2
(45) Date of Patent: Apr. 15, 2025

(54) PROCESS FOR MANUFACTURING A METAL PART

(71) Applicant: CREUZET AERONAUTIQUE, Marmande (FR)

(72) Inventors: Cyril Vergine, Fourques-sur-Garonne (FR); Bernard Costeplane, Labastide Castel Amouroux (FR)

(73) Assignee: Creuzet Aeronautique, Marmande (FR)

( * ) Notice: Subject to any disclaimer, the term of this patent is extended or adjusted under 35 U.S.C. 154(b) by 0 days.

(21) Appl. No.: 17/966,725

(22) Filed: Oct. 14, 2022

(65) Prior Publication Data

US 2023/0138062 A1    May 4, 2023

(30) Foreign Application Priority Data

Oct. 28, 2021 (FR) ...................................... 2111471

(51) Int. Cl.
*B21D 35/00* (2006.01)
*B21D 22/20* (2006.01)
(Continued)

(52) U.S. Cl.
CPC ......... *B21D 35/001* (2013.01); *B21D 22/208* (2013.01); *B21D 24/16* (2013.01); *B21D 47/01* (2013.01); *B21D 53/92* (2013.01)

(58) Field of Classification Search
CPC ........ B21D 24/005; B21D 24/16; B21D 5/01; B21D 5/02; B21D 5/0209; B21D 5/029;
(Continued)

(56) References Cited

U.S. PATENT DOCUMENTS

| 966,952 | A |   | 8/1910 | Remington |
| 1,925,721 | A | * | 9/1933 | Johnston ................. B21K 1/74 |
|   |   |   |   | 72/325 |

(Continued)

FOREIGN PATENT DOCUMENTS

| CN |   | 103331577 |   | 10/2013 |   |
| GB |   | 812563 A | * | 4/1959 | ............... B23K 1/00 |

(Continued)

OTHER PUBLICATIONS

Knecht, Frank, Preliminary Search Report, Jun. 10, 2022, 2 pages, Institut National de la Propriété Industrielle, Paris, France.

*Primary Examiner* — Debra M Sullivan
*Assistant Examiner* — Matthew Stephens
(74) *Attorney, Agent, or Firm* — Henricks Slavin LLP

(57) ABSTRACT

A process for manufacturing a metal part (10), is described said part extending in a first direction (Y) and having a section comprising a central member (14) and at least a first side member (16) extending in a second direction. The process comprises the following steps: supply of a metal blank (30); removing material from the blank so as to form an intermediate part (32) comprising the central member (14), a junction zone (12) and at least first (116) and second (118) intermediate side members, with a space (34) between the first and second intermediate side members; and hot forming (104) the intermediate part, including spreading the first and second intermediate side members apart by inserting a first punch (212) between said members.

14 Claims, 6 Drawing Sheets

(51) Int. Cl.
*B21D 24/16* (2006.01)
*B21D 47/01* (2006.01)
*B21D 53/92* (2006.01)

(58) Field of Classification Search
CPC ...... B21D 5/04; B21D 35/001; B21D 35/002; B21D 47/01; B21D 47/02; B21D 53/92
See application file for complete search history.

(56) References Cited

U.S. PATENT DOCUMENTS

| | | | | | |
|---|---|---|---|---|---|
| 2,726,972 | A | * | 12/1955 | Corral | C22F 1/00 |
| | | | | | 148/625 |
| 3,713,205 | A | | 1/1973 | Wogerbauer | |
| 4,040,177 | A | * | 8/1977 | Beeler | H01R 13/112 |
| | | | | | 29/874 |
| 4,433,949 | A | * | 2/1984 | Hallock | B21G 3/12 |
| | | | | | 470/159 |
| 5,050,299 | A | * | 9/1991 | Rainville | B21D 47/01 |
| | | | | | 29/522.1 |
| 6,550,302 | B1 | * | 4/2003 | Ghosh | B21D 37/16 |
| | | | | | 72/342.8 |
| 6,718,812 | B1 | * | 4/2004 | Jaekel | B21B 1/0815 |
| | | | | | 72/368 |
| 2014/0349131 | A1 | * | 11/2014 | Seki | B32B 38/0004 |
| | | | | | 428/598 |

FOREIGN PATENT DOCUMENTS

| | | | | |
|---|---|---|---|---|
| JP | S60240303 | | 11/1985 | |
| KR | 910004663 | B1 * | 7/1991 | ............... B21B 1/08 |
| WO | WO 94/23890 | | 10/1994 | |

* cited by examiner

PROCESS FOR MANUFACTURING A METAL PART

BACKGROUND

The present invention relates to a process for manufacturing a metal part extending in a first direction and having a section comprising a central member and at least a first side member extending in a second direction, the first and second directions being different to each other.

The invention is particularly applicable to structural members, for example in the field of aeronautics.

Manufacturing processes for such metal parts are known, for example in patent U.S. Pat. No. 3,713,205. However, this process includes a welding step at the junction zone, which potentially causes lower mechanical strength in the obtained part.

The purpose of the present invention is to provide an improved process for making such a metal part.

SUMMARY

To this end, the invention concerns a manufacturing process of the aforementioned type, comprising the following steps: supply of a metal blank of substantially rectangular cross-section, said blank extending in the first direction; at least one step involving removing material from the metal blank, so as to form an intermediate part comprising the central member, extending in the first direction; a junction zone and at least a first and a second intermediate side member, extending in parallel substantially in the first direction from said junction zone, opposite the intermediate central member; a space being provided between the first and second intermediate side members; at least a first hot forming of the intermediate part, said first forming comprising heating of the intermediate part, followed by a step of spreading the first and second intermediate side members by inserting a first punch between said first and second members, the central member being clamped in a die to block movement of the intermediate part in at least one transverse direction perpendicular to the first direction; so as to obtain the metal part.

Among other advantageous aspects of the invention, the process comprises one or more of the following features, taken individually or in accordance with all technically possible combinations:
- the first punch has a V-shaped section defined by an angular sector delimited by first and second planar surfaces intersecting at an apex, the angular sector having an angle $\alpha$ of between 10° and 160°;
- the manufacturing process comprises at least a second hot forming, the second forming using at least a second punch, the at least second punch having an angular sector greater than the angular sector of the first punch;
- at least a first or second punch used during a hot forming step comprises three angular sectors, one angular sector being smaller than the other two angular sectors and disposed between said other two angular sectors;
- the die has a planar bearing surface, and at least the second punch has an angular sector substantially equal to 180°;
- the die has a non-planar bearing surface, and at least one first or second punch has an angular sector substantially different from 180°;
- the metal part is made of titanium alloy, heating being carried out at a temperature of between 600° C. and 950° C., and preferably close to 900° C.;
- the metal part is made of an aluminum alloy, heating being carried out at a temperature of between 400° C. and 550° C., and preferably of between 450° C. and 480° C.;
- in a hot forming step, at least one of the first punch and the die is heated to a temperature at least 50° C. lower than the heating temperature of the blank or an intermediate part;
- the heating of the first punch and/or the die is carried out at 350° C. to 450° C.

The invention further relates to a process for manufacturing a metal angle, comprising the following steps: supply of a T-shaped metal part made by a process as described above; then cutting said metal part according to a plane passing through the central member, the first and a second side members being arranged on either side of said plane.

The invention further relates to a process for manufacturing an X-shaped metal section, comprising the following steps: supply of a metal part made by a process as described above, said metal part having a Y-shaped cross-section; then a second step of removing material from the free end of the central member so as to create third and fourth side members, and then at least one step of hot forming the third and fourth side members, so as to obtain an X-shaped metal part.

BRIEF DESCRIPTION OF THE DRAWINGS

The invention will be better understood upon reading the following description, which is presented only as a non-limiting example, and with reference to the drawings, in which.

DETAILED DESCRIPTION

Figure 1:
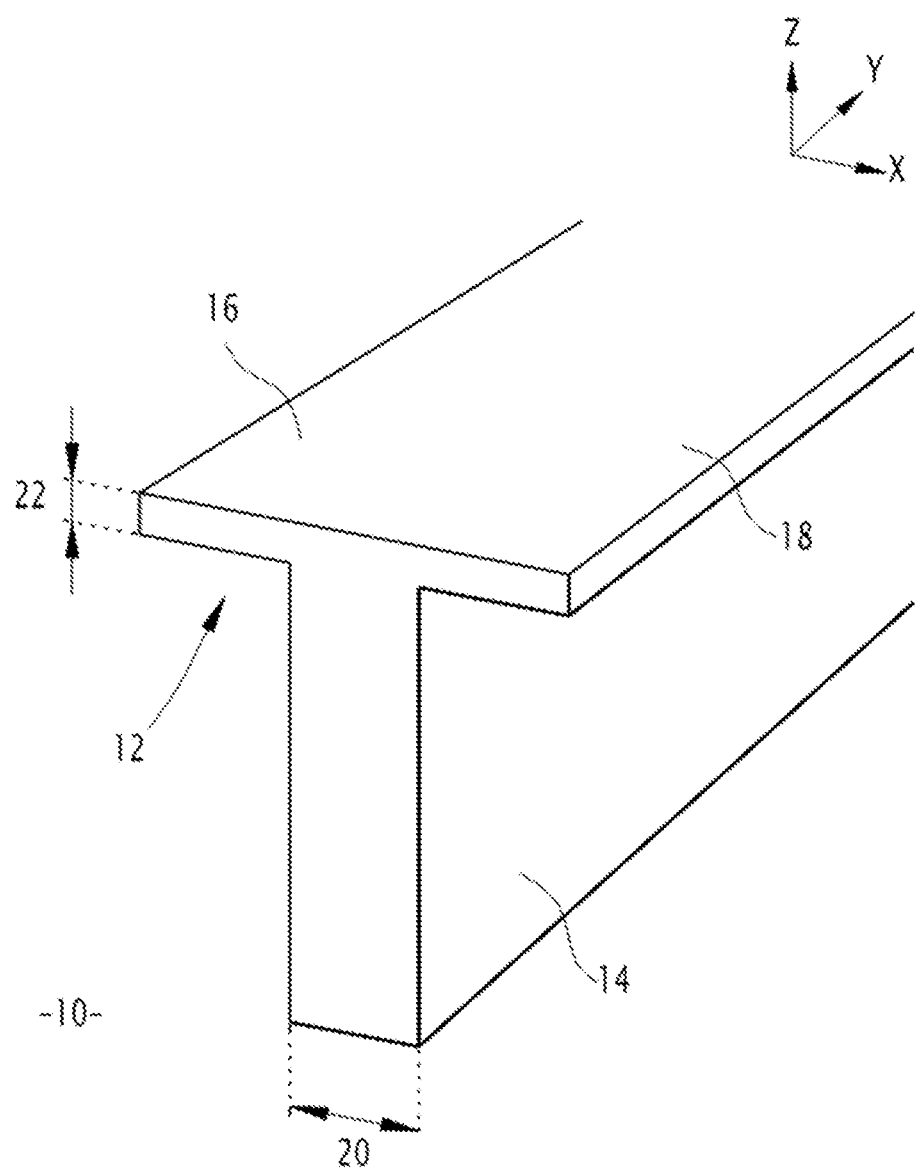
FIG. 1 is a perspective view of a metal part according to one embodiment of the invention.

FIG. 1 shows a T-shaped metal part 10 obtained according to a first embodiment of the invention. Said part 10 is intended to be used as a structural member, for example in an aircraft.

An orthonormal basis (X, Y, Z), associated with the part 10, is shown.

The part 10 extends in one main direction, corresponding to the Y direction. As seen in FIG. 1, the part 10 has a substantially T-shaped cross-section perpendicular to said main direction.

In particular, the part 10 comprises a junction zone 12, a central member 14, and first 16 and second 18 side members.

The central member 14 extends in a first transverse direction, corresponding to the Z-direction, from the junction zone 12. The first 16 and second 18 side members extend away from each other in a second transverse direction, corresponding to the X direction, from said junction zone 12.

Preferably, the part 10 is substantially symmetrical with respect to a plane (Y, Z) (FIG. 2) passing through the central member 14, the first 16 and second 18 side members being mirror images of each other with respect to said plane.

In the embodiment shown, the first 16 and second 18 side members have comparable thicknesses. In the embodiment shown in FIG. 1, a thickness 20 along X of the central member 14 is substantially equal to three times the thickness 22 along Z of each of the first 16 and second 18 side members. As a variant, a ratio between thickness 20 and thickness 22 is between 1 and 3.

Preferably, the part 10 is made of titanium or a Ti-6Al-4V type titanium alloy. As a variant, the part 10 is made of another metal such as steel or aluminum, a superalloy or a steel or aluminum alloy.

Figure 2:
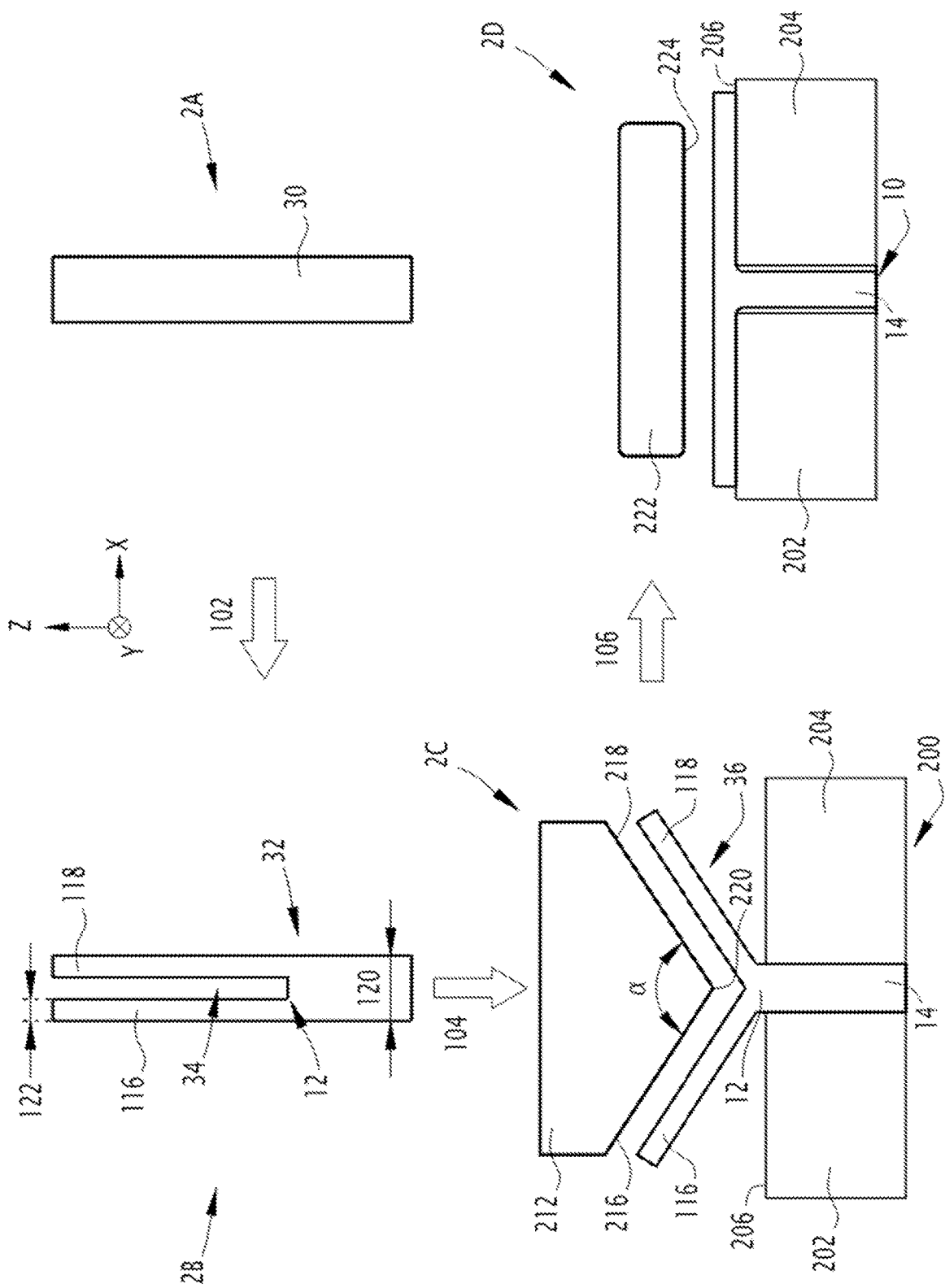
FIG. 2 is a schematic representation of a process for manufacturing the metal part in FIG. 1.

FIG. 2 schematically represents a process 100 for making the above-described part 10 according to one embodiment of the invention.

A first step of said process is the supply of a metal blank 30 (view 2A of FIG. 2). Said blank 30 extends in the main Y direction.

The blank 30 has a substantially parallelepiped shape, a section of said blank perpendicular to Y preferably having a rectangular shape.

In the next step 102 (view 2B of FIG. 2), the metal blank 30 is split, so as to form a first intermediate part 32. The slot thus formed extends in the main Y direction.

Specifically, the first intermediate part 32 comprises the junction zone 12, the central member 14, and a first 116 and a second 118 intermediate side members, intended to form the first 16 and second 18 side members of the part 10.

In the first intermediate part 32, the first 116 and second 118 intermediate side members extend substantially in the first transverse direction Z from the junction zone 12 away from the central member 14. A gap 34 is formed by removing material between said first 116 and second 118 intermediate side members.

Preferably, the material removal step is performed using a digitally-controlled milling machine. As a variant, the material removal step is performed by electro-erosion.

The metal blank 30 material removal step defines a thickness 120 of the central member 14 and a thickness 122 of the first 116 and second 118 side members. Preferably, the thickness 120 is about three times the thickness 122. The said thicknesses 120 and 122 are preferably slightly greater than the corresponding thicknesses 20 and 22, in order to compensate for thickness variations related to the following process steps, described below.

In the next step 104 (view 2C of FIG. 2), the first intermediate part 32 is heated in a furnace for the first time, at a temperature preferably around 900° C. for a titanium alloy, and in any case below the beta-transus temperature of the titanium alloy in question.

Heating is followed by insertion of the central member 14 of the first intermediate part 32 in a die 200. Said die comprises two mobile elements 202 and 204, capable of clamping the central member 14 between them. Preferentially, the mobile elements 202 and 204 are configured to allow the clamping of the central member 14 without clamping the junction zone 12 nor the first 116 and second 118 side members, the ends of said side members being free.

In this example, the two elements 202 and 204 define a substantially planar bearing surface 206. When the central member 14 is disposed between the elements 202 and 204, the bearing surface 206 is disposed in a plane (X, Y) according to the orthonormal basis associated with the metal part.

When the central member 14 of the first intermediate part 32 is inserted between the elements 202 and 204 and clamped, the junction zone 12 is disposed above the bearing surface 206 in order the side members 116 and 188 may be deformed on all their length until coming in abutment on the bearing surface 206.

With the central member 14 of the first heated intermediate part 32 held in a locking position by the two elements 202 and 204, a first punch 212 is inserted between the first 116 and second 118 intermediate side members so as to move them apart in a (X, Z) plane.

The first punch 212 preferably has a V-shaped profile. More specifically, the first punch includes first 216 and second 218 substantially planar surfaces. The surfaces 216 and 218 intersect at an edge 220 disposed along Y and define an angular sector with an angle α. The surfaces 216 and 218 are intended to make contact with the first 116 and second 118 intermediate side members, respectively. The first 216 and second 218 surfaces are in this example substantially symmetrical with respect to a plane (Y, Z) passing through the edge 220. The angle α is between 10° and 160°.

After cooling, a second intermediate part 36, shown in view 2C of FIG. 2, is obtained. The first 116 and second 118 intermediate side members of said second intermediate part 36 extend in different and divergent directions from each other.

In the next step 106, the second intermediate part 36 undergoes a second furnace heating, preferably of the order of 900° C. for a titanium alloy. After heating, the central member 14 of said second intermediate part 36 is clamped back into the die 200.

With the central member 14 held tight by members 202 and 204, a second punch 222 is applied to the first 116 and second 118 intermediate side members (2D view of FIG. 2). This second punch has a planar surface 224 that is applied opposite the bearing surface 206 of the die 200. A force is applied between the second punch 222 and the die 200. For example, for a titanium alloy metal part of 1 to 3 meters long, a force of about 3,300 tons is applied. The second punch may be held for a few seconds or minutes on the first 116 and second 118 intermediate side members against the die 200, depending on the force applied and the surface area of the intermediate side members.

Preferably, during this second hot forming, the die 200 and the punch 222 are heated to a temperature between 350° C. and 450° C. and more preferably around 400° C.

The hot forming step can be repeated several times, with identical or different punches, preferably with increasingly large angular sectors.

In particular, according to one embodiment, the step 106 is repeated a second time with the same second punch 222, in order to ensure the coplanarity of the first 116 and second 118 side members, especially after the second intermediate part 36 has cooled. The heating temperatures of each intermediate part, each punch and the die may be the same as or different to those in the previous step.

In another embodiment, the step 106 is performed using a punch with a V-shaped profile and a larger angular sector than the first punch 212 used for the first forming step 104.

The hot forming step can thus be repeated several times, with identical and/or different punches, the angular sector of the punch progressing from an acute angle to an obtuse angle.

Figure 5:
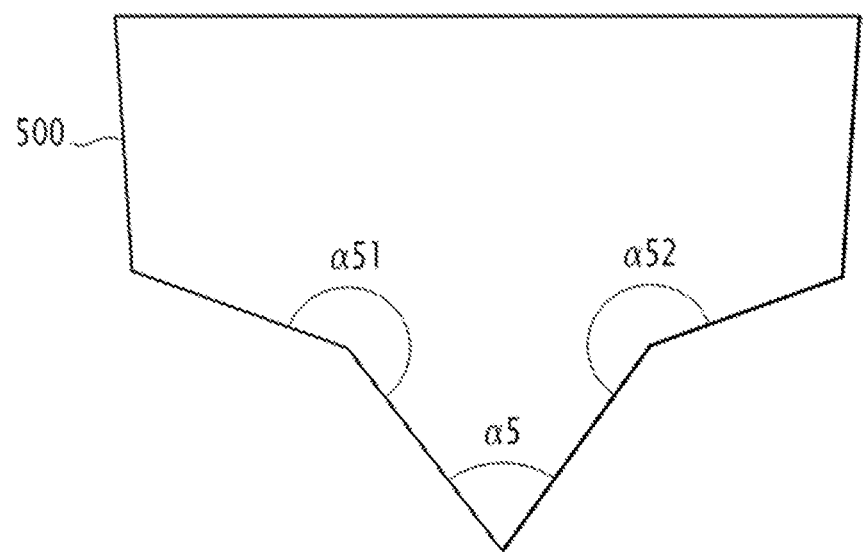
FIG. 5 is a schematic representation of a device used in a process for manufacturing a metal part according to a first embodiment of the invention.

As a variant, at least one punch 500 has a so-called 'broken' V-profile, comprising three angular sectors, namely a central angular sector $α_5$ and two lateral angular sectors $α_{51}$ and $α_{52}$, the central angular sector as being smaller than the two lateral angular sectors and disposed between said lateral angular sectors $α_{51}$ and $α_{52}$. Such a punch is shown in FIG. 5. In one embodiment, the central angular sector $α_5$ is greater than 10° and less than the lateral angular sectors $α_{51}$ and $α_{52}$. Preferably, the lateral angular sectors $α_{51}$ and $α_{52}$ are greater than or equal to 100° and less than or equal to 160°.

In the example described, the bearing surface 206 of the die 200 is planar, and the profile of the punch varies from a V-shaped profile having an acute angular sector to a planar profile having an angular sector of 180° . As a variant, the die bearing surface has an acute or obtuse V-shaped profile. The angular sectors of the punch(es) must of course be adapted accordingly.

After cooling, the metal part 10 described above is obtained.

Figure 3:
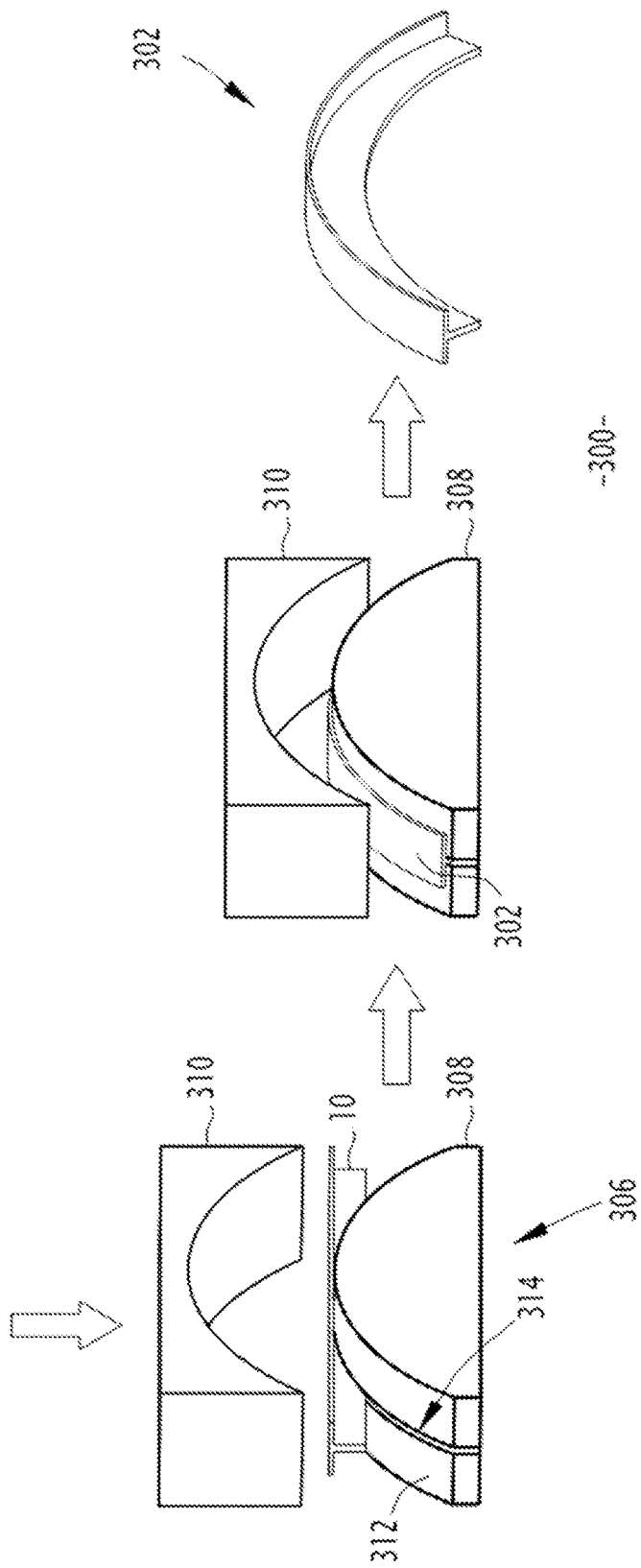
FIG. 3 is a schematic representation of a process for manufacturing a metal part according to a second embodiment of the invention, starting from the metal part of FIG. 1.

FIG. 3 schematically represents a process 300 for making a curved part 302 according to a second embodiment of the invention, from the part 10 described above.

The process 300 uses a bending tool 306. Said bending tool includes a support element 308 and a press element 310.

The support element 308 includes a top surface 312 and a slot 314 formed in said top surface.

The top surface 312 is shaped like a portion of a circular cylinder. The slot 314 follows a circular arc path, a radius of said circle corresponding to the desired curvature of the curved part 302. As a variant, the top surface 312 has a non-circular curved shape, such as a curved base formed by a succession of radii and/or flat sections.

On either side of the slot 314, the walls of the support element 308 may be moved toward each other.

The press element 310 has a concave surface substantially complementary to the top surface 312 of the support element.

In the first step of the process 300, the metal part 10 undergoes a first heating in a furnace at a temperature preferably of around 900° C. for a titanium alloy.

After heating, the part 10 is transferred to the bending tool 306. More specifically, the central member 14 of the part 10 is eased into the slot 314 and clamped between the walls of the support element 308. In addition, the hot part 10 is optionally held in the support element 308 using flanges (not shown). Other holding devices may be used.

The press element 310 is then lowered toward the support element 308 so as to bend the part 10, at a speed of between 1 and 20 mm/s.

The press element 310 may be held against the support element 308 for between 10 seconds and 30 minutes. At the end of the bending step, the press element 310 is raised and the resulting curved profile 302 is removed from the support element 308.

A stress relieving step may be performed to relieve the residual stresses induced by the previous forming steps by performing a heat treatment on the curved part 302.

A final machining step may be performed to bring the curved part 302 to the desired dimensions.

Figure 4:
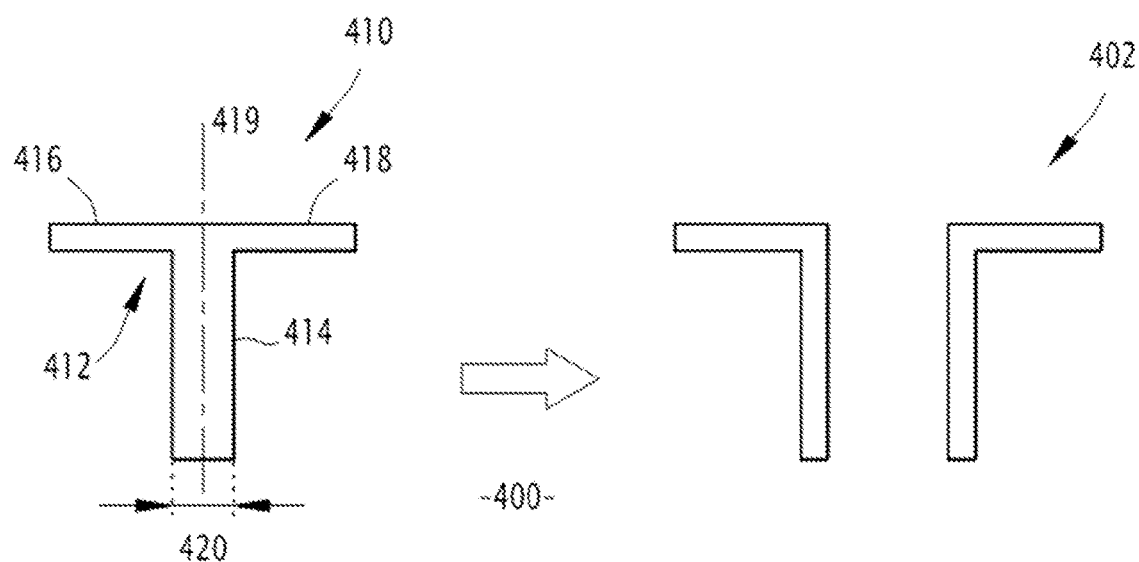
FIG. 4 is a schematic representation of a process for manufacturing a metal part according to a third embodiment of the invention, starting from a metal part analogous to the part in FIG. 1.

FIG. 4 illustrates a process 400 for producing angles 402 according to an embodiment of the invention.

The process 400 includes making a metal part 410 with a T-shaped cross-section, similar to the metal part 10 described above. The part 410 extends along the main Y direction and comprises, among other things, a junction zone 412, a central member 414, and first 416 and second 418 side members. The part 410 is made according to the process 100 described above.

The process 400 then includes a step of cutting the part 410 along a plane of symmetry 419 of said part, passing through the central member 414. The first 416 and second 418 side members are disposed on opposite sides of said plane.

Two substantially identical angles 402 are obtained, each of the two angles having an L-shaped cross-section perpendicular to the main direction.

A difference between the part 410 of FIG. 4 and the part 10 of FIG. 1 is that the thickness 420 of the central member 414 is defined by considering that said part 410 is cut along the plane of symmetry 419. The said thickness 420 is thus chosen according to the desired dimensions of the angles 402.

According to variant embodiments of the invention, processes similar to the processes described above are used to manufacture metal parts with a Y- or X-section.

To make a Y-shaped part, the process described above for forming a T-shaped part is used, but no punch has a 180° angular sector. The die may have a planar or non-planar bearing surface, for example in the shape of a V, corresponding to the angular sector between the two side members, the hot forming step(s) being carried out with at least one punch having an angular sector substantially different from 180° . The Y-shaped part is, for example, analogous to the second intermediate part 36, shown in view 2C of FIG. 2.

Figure 6:
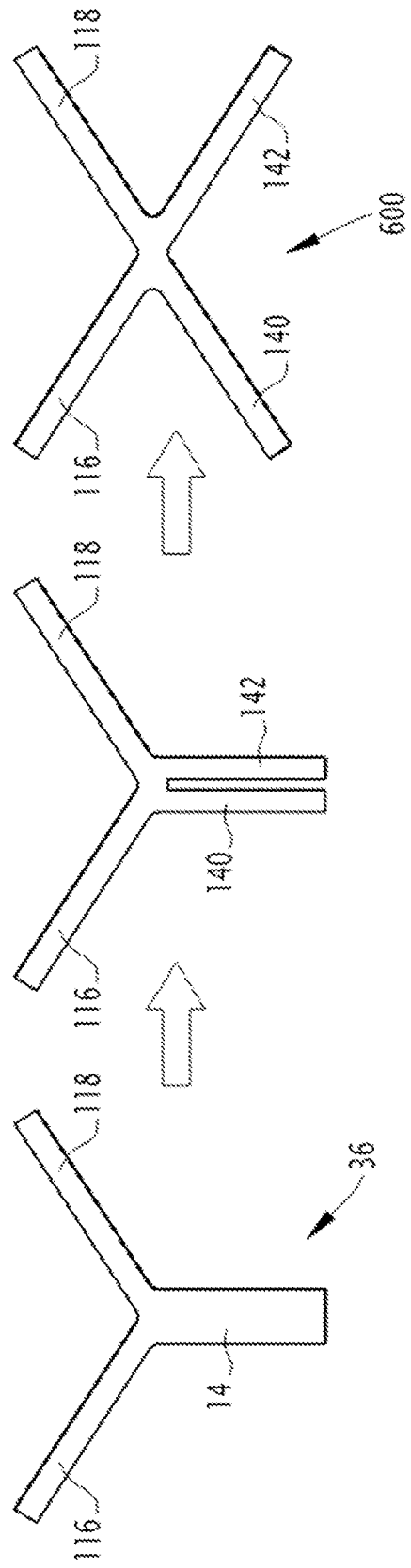
FIG. 6 is a schematic representation of a process for manufacturing a metal part according to a fourth embodiment of the invention.

A process for manufacturing an X-shaped part 600 is schematically shown in FIG. 6. Said process comprises making a second intermediate Y-shaped part 36, as described above, and then a second material removal step performed at the free end of the central member 14 of said part. Third 140 and fourth 142 side members are thus formed.

One or more hot forming steps are then performed to distort the third 140 and fourth 142 side members into a V shape, preferably by clamping the first 116 and second 118 side members in a die of suitable shape.

As a variant, the metal blank 30 of rectangular cross-section, visible in FIG. 2, may be split at each end, before the side members of each end are distorted in turn to form an X-shaped profile.

Alternatively, the metal part can be later cut into the plane (X, Z) into slices to provide a semi-finished part. The thickness of the semi-finished part in the Y direction can be between a few centimeters, and two meters. The semi-finished part can later be stamped and/or machined to obtain a finished part, such as, for example, a Y-shaped landing gear scissor, a C-shaped hinge, an L-shaped flange, a structural tee or a T-shaped junction tee.

For example, the process for manufacturing a finished part such as a landing gear scissor includes the following steps: manufacturing a Y-shaped metal part as described earlier; then a step of cutting into slices the Y-shaped metal part so as to obtain at least one semi-finished part having a section in Y; then a step of stamping or machining the semi-finished part so as to obtain the landing gear scissor.

The method of the invention has a significant material gain compared to the billet machining process.

The method of the invention requires less power than a forging press.

The invention claimed is:

1. A process, comprising:
   supplying a metal blank defining a rectangular cross-section, extending in a first direction (Y) from one first direction end to the other first direction end, extending a second length in a second direction (Z), perpendicular to the first direction, from one second direction end to the other second direction end, and extending a third length in a third direction (X), perpendicular to the first and second direction, from one third direction end to the other third direction end;

at least one step of removing material from the metal blank so as to form an intermediate part including a central member extending in the first direction, a junction zone at one end of the central member, and at least first and second intermediate side members, which define first and second intermediate side member lengths, extending in parallel in the first direction from said junction zone away from the central member with a space between the first and second intermediate side members that extends the entire first length in the first direction, that extends a distance that is less than the entire second length in the second direction to the junction zone, that extends a distance that is less than the entire third length in the third direction, and that occupies the entire volume defined by the entire first length, the distance that is less than the entire second length and the distance that is less than the entire third length;

at least a first hot forming of the intermediate part by heating the intermediate part in a furnace, followed by clamping the central member of the heated intermediate part between two mobile elements of a die to block movement of the heated intermediate part in the first direction and in a transverse direction perpendicular to the first direction and with the junction zone and the first and second intermediate side members located above the mobile elements, and then spreading the first and second intermediate side members by inserting a first punch between said first and second intermediate side members, so as to obtain a metal part including the central member and first and second side members that extend in different directions and that define first and second side member lengths that are equal to the first and second intermediate side member lengths.

2. The manufacturing process of claim 1, wherein the first punch has a V-shaped cross-section defined by an angular sector delimited by first and second planar surfaces intersecting at an apex, the angular sector having an angle (α) of between 10° and 160°.

3. The manufacturing process of claim 1, including at least a second hot forming, the second hot forming using at least one second punch, the at least second punch having an angular sector greater than the angular sector of the first punch.

4. The manufacturing process according to claim 3, wherein at least the first punch or the second punch used during a hot forming step comprises three angular sectors, one angular sector being smaller than the other two angular sectors and disposed between said other two angular sectors.

5. The manufacturing process of claim 3, wherein the die has a planar bearing surface, and at least the second punch has an angular sector substantially equal to 180°.

6. The manufacturing process of claim 3, wherein the die has a non-planar bearing surface, and at least one of the first punch and the second punch has an angular sector different from 180°.

7. A manufacturing process according to claim 1, wherein the metal part is made of titanium alloy, the heating being carried out at a temperature between 600° C. and 950° C.

8. A manufacturing process according to claim 1, wherein the metal part is made of aluminum alloy, the heating being carried out at a temperature between 400° C. and 550° C.

9. A manufacturing process according to claim 1, wherein, in the hot forming step, at least one of the first punch and the die is heated to a temperature at least 50° C. lower than the heating temperature of the blank or an intermediate part.

10. The manufacturing process of claim 9, wherein the heating of the first punch and/or die is performed at 350° C. to 450° C.

11. A process for manufacturing a metal L-shaped part, comprising the following steps: supply of a T-shaped metal part made by a process according to claim 1; then cutting said metal part according to a plane passing through the central member, the first and a second side members being arranged on either side of said plane.

12. A process for manufacturing an X-shaped metal part, comprising the following steps: supply of a metal part made by a process according to claim 1, said metal part having a Y-shaped cross-section; then a second step of removing material from the free end of the central member so as to create third and fourth side members, and then at least one step of hot forming the third and fourth side members, so as to obtain an X-shaped metal part.

13. A process for manufacturing a finished part in the form of T, Y, L or X comprising the following steps: supply of a metal part made by a method according to claim 1, said metal part having a section in T, Y, L or X; then a step of cutting into slices of the metal part in the first direction (Y) so as to obtain a semi-finished part in the shape of T, Y, L or X; then a step of stamping or machining the semi-finished part so as to obtain the finished part.

14. A manufacturing process according to claim 1, wherein the metal part is made of aluminum alloy, the heating being carried out at a temperature between 450° C. and 480° C.

* * * * *